(12) United States Patent
Roybal

(10) Patent No.: US 8,827,361 B2
(45) Date of Patent: Sep. 9, 2014

(54) CHILD HEAD AND NECK PROTECTOR

(71) Applicant: Vincent Roybal, Santa Fe, NM (US)

(72) Inventor: Vincent Roybal, Santa Fe, NM (US)

(*) Notice: Subject to any disclaimer, the term of this patent is extended or adjusted under 35 U.S.C. 154(b) by 0 days.

(21) Appl. No.: 13/845,778

(22) Filed: Mar. 18, 2013

(65) Prior Publication Data
US 2013/0249261 A1 Sep. 26, 2013

Related U.S. Application Data

(60) Provisional application No. 61/614,851, filed on Mar. 23, 2012.

(51) Int. Cl.
B60N 2/42 (2006.01)
B60N 2/28 (2006.01)

(52) U.S. Cl.
CPC ............ B60N 2/4249 (2013.01); B60N 2/2812 (2013.01); B60N 2/2839 (2013.01); B60N 2002/2815 (2013.01); B60N 2002/2818 (2013.01)
USPC .................................................. 297/216.11

(58) Field of Classification Search
USPC ...................... 297/216.11, 397, 464, 487, 488
See application file for complete search history.

(56) References Cited

U.S. PATENT DOCUMENTS

| 4,607,885 | A | * | 8/1986 | del Fierro | 297/397 |
|---|---|---|---|---|---|
| 4,707,031 | A | * | 11/1987 | Meistrell | 297/393 |
| 4,838,611 | A | * | 6/1989 | Talaugon | 297/391 |
| 5,064,245 | A | * | 11/1991 | Stephens | 297/397 |
| 5,137,335 | A | | 8/1992 | Marten | |
| 5,486,037 | A | | 1/1996 | Harper | |
| 5,795,020 | A | * | 8/1998 | Sirico | 297/256.15 |
| 5,988,752 | A | | 11/1999 | Richards | |
| 6,266,832 | B1 | | 7/2001 | Ezell | |
| 6,386,639 | B1 | * | 5/2002 | McMichael | 297/464 |
| 6,435,617 | B1 | * | 8/2002 | McNair | 297/397 |
| 6,484,335 | B2 | * | 11/2002 | Gilbert | 5/636 |
| 6,523,901 | B2 | * | 2/2003 | Smith | 297/392 |
| 6,641,221 | B1 | * | 11/2003 | Kastlunger | 297/397 |
| 6,748,615 | B1 | * | 6/2004 | Tiedemann | 297/397 |
| 6,758,526 | B2 | | 7/2004 | Marbutt | |
| 6,799,802 | B1 | | 10/2004 | Moran | |
| 6,957,462 | B1 | * | 10/2005 | Wilcox | 5/636 |
| 7,188,899 | B1 | | 3/2007 | McClellan-Derrickson | |
| 7,628,456 | B1 | * | 12/2009 | Swartz | 297/464 |
| 7,740,318 | B2 | * | 6/2010 | Funke et al. | 297/393 |
| 8,287,045 | B1 | * | 10/2012 | Donohue et al. | 297/464 |
| 2005/0173961 | A1 | * | 8/2005 | Morphew et al. | 297/397 |
| 2009/0151079 | A1 | | 6/2009 | Espindola et al. | |
| 2010/0102604 | A1 | | 4/2010 | Barnes et al. | |
| 2011/0043025 | A1 | | 2/2011 | Park | |
| 2011/0140495 | A1 | | 6/2011 | Nourishad | |

* cited by examiner

Primary Examiner — Paul N Dickson
Assistant Examiner — Robert A Coker
(74) Attorney, Agent, or Firm — Buckingham, Doolittle & Burroughs, LLC

(57) ABSTRACT

A head and neck protector device is disclosed that provides an additional layer of physical protection by stabilizing a child's neck and upper body in case of an automobile accident. The head and neck protector device comprises a restraint strap and a clasp. The restraint strap comprises a cushioning component and is designed to wrap around a child's car seat and be removably secured together, end to end. The clasp comprises a male component and a female component, which matingly attach together to secure the restraint strap. The head and neck protector device further comprises a pair of brackets, which are secured to opposing sides of the child's car seat, and comprise an opening for receiving the restraint strap. The brackets can be permanently secured to the sides, or a pair of positioning components can be used to removably secure the brackets to the sides of the car seat.

10 Claims, 5 Drawing Sheets

CHILD HEAD AND NECK PROTECTOR

CROSS-REFERENCE

This application claims priority from Provisional Patent Application Ser. No. 61/614,851 filed Mar. 23, 2012.

BACKGROUND

In the case of an automobile accident, ranging from sudden stops, fender-benders to even major collisions, a child in a car seat may experience severe whiplash to the head and neck. This can lead to injury or even death. Traditional car seats protect the child's body, but offer little to no head and neck stabilization. There is not a feature available to absorb the shock of a collision effectively, putting the child at unnecessary risk. Other safety features are too restrictive and do not allow a child to engage in comfortable movement while positioned in the car seat. A safety accessory that helps to stabilize a child's head and neck in a car seat is necessary.

There is a need for a device that absorbs the shock of an automobile accident, protecting the head and neck of a child in a car seat. The present invention provides an additional layer of physical protection by stabilizing a child's neck and upper body in case of an automobile accident. Using this device can reduce the risk of injury and even death for children in car seats. This device provides stability without restricting comfortable movement for the child. This head and neck protector device can be easily installed on any existing car seat, making it a convenient addition to current safety practices already in place. Anyone with a child would benefit from the safety this device provides.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a head and neck protector device that provides an additional layer of physical protection by stabilizing a child's neck and upper body in case of an automobile accident. The head and neck protector device comprises a restraint strap and a clasp. The male component and the female component are each secured to the first and second ends of the restraint strap. The restraint strap is designed to wrap around a child's car seat and be removably secured together, end to end. The clasp typically comprises a male component and a female component, which matingly attach together to secure the restraint strap around a child's care seat. The head and neck protector device further comprises a pair of brackets, which are secured to opposing sides of the child's car seat. The brackets typically comprise an opening for receiving the restraint strap. The brackets can be permanently secured to the opposing sides of the child's car seat, or a pair of positioning components can be used to removably secure the brackets to the opposing sides of the child's car seat.

In a preferred embodiment, the restraint strap can further comprise a cushioning component that encases or surrounds a portion of the restraint strap. The cushioning component would generally be constructed of open cell foam, and is preferably tubular or cylindrical in shape. Thus, the cushioning component comprises a durable, yet soft material to cushion the child's head during an automobile accident or to the support a child's head falling onto his/her chest as he/she falls asleep when the vehicle is in motion.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF PREFERRED EMBODIMENTS

Figure 1:
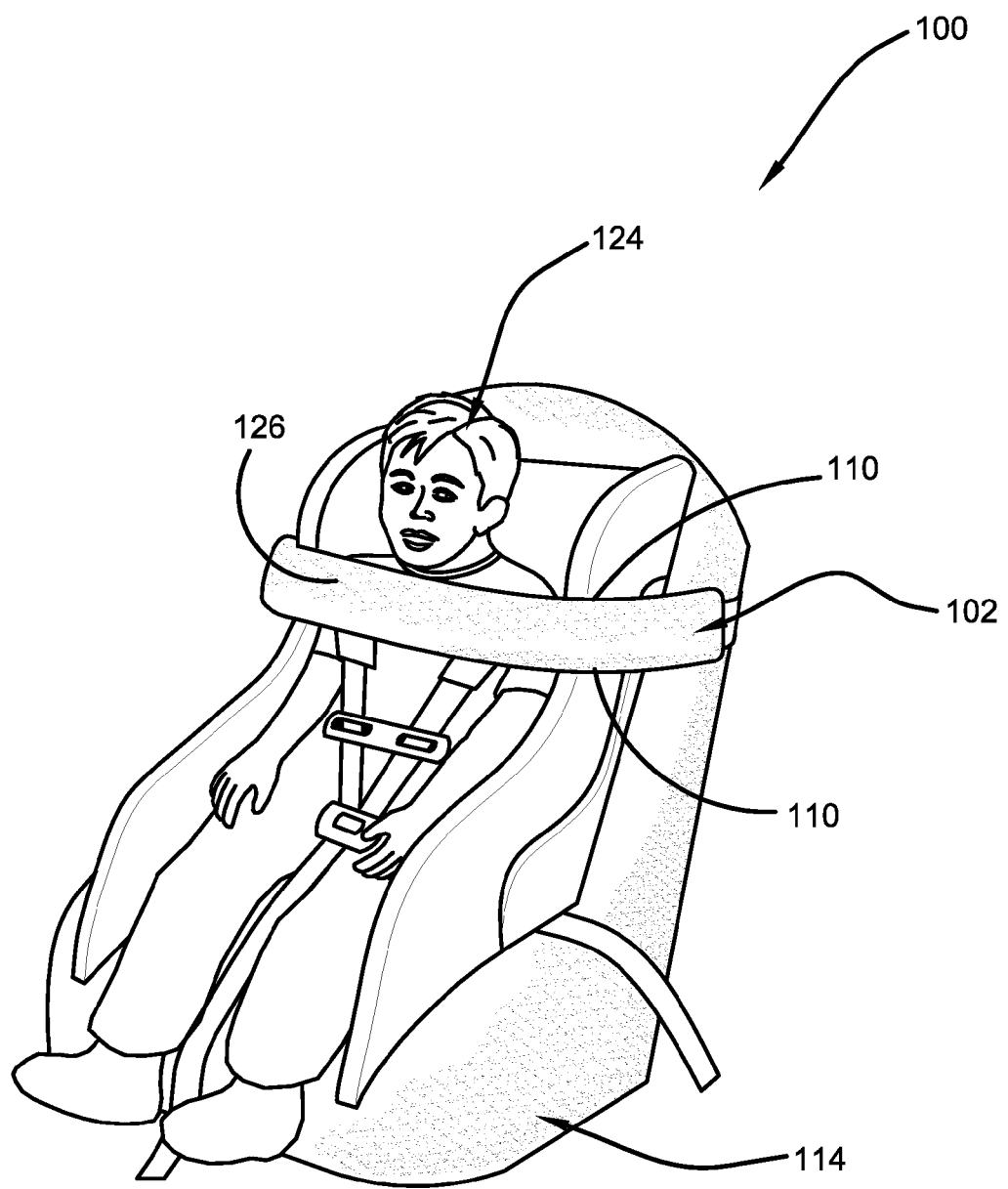
FIG. 1 illustrates a perspective view of the head and neck protector device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a head and neck protector device that is used to prevent a child's head from being thrown forward in an automobile accident. This product may comprise a tube of durable, yet soft material that can be attached to any car seat at a height just below the child's eye level so as not to interfere with the child's vision. At this height, the head and neck protector device will also offer support to a child's head falling onto his/her chest as he/she falls asleep when the vehicle is in motion.

The disclosed head and neck protector device comprises a restraint strap and a clasp. The restraint strap comprises a cushioning component and is designed to wrap around a child's car seat and be removably secured together, end to end. The clasp comprises a male component and a female component, which matingly attach together to secure the restraint strap. The head and neck protector device further comprises a pair of brackets, which are secured to opposing sides of the child's car seat, and comprise an opening for receiving the restraint strap. The brackets can be permanently secured to the opposing sides of the car seat, or a pair of positioning components can be used to removably secure the brackets to the opposing sides of the car seat.

Referring initially to the drawings, FIGS. 1-2, 2A, and 3 illustrate the head and neck protector device 100 that provides an additional layer of physical protection by stabilizing a child's neck, upper body, and head in case of an automobile accident. The head and neck protector device 100 comprises a restraint strap 102, and a clasp 104.

The restraint strap 102 comprises a first end 106 and a second end 108. Typically, the restraint strap 102 is rectangular in shape, however any other suitable shape can be used as is known in the art without affecting the overall concept of the invention. The restraint strap 102 would generally be constructed of nylon, polyvinyl chloride (PVC), Kevlar®, or any other similar fabrics, etc., though any other suitable material may be used to manufacture the restraint strap 102 as is known in the art without affecting the overall concept of the invention. The restraint strap 102 can also comprise a variety of colors and designs to suit user and manufacturing preference.

Figure 2:
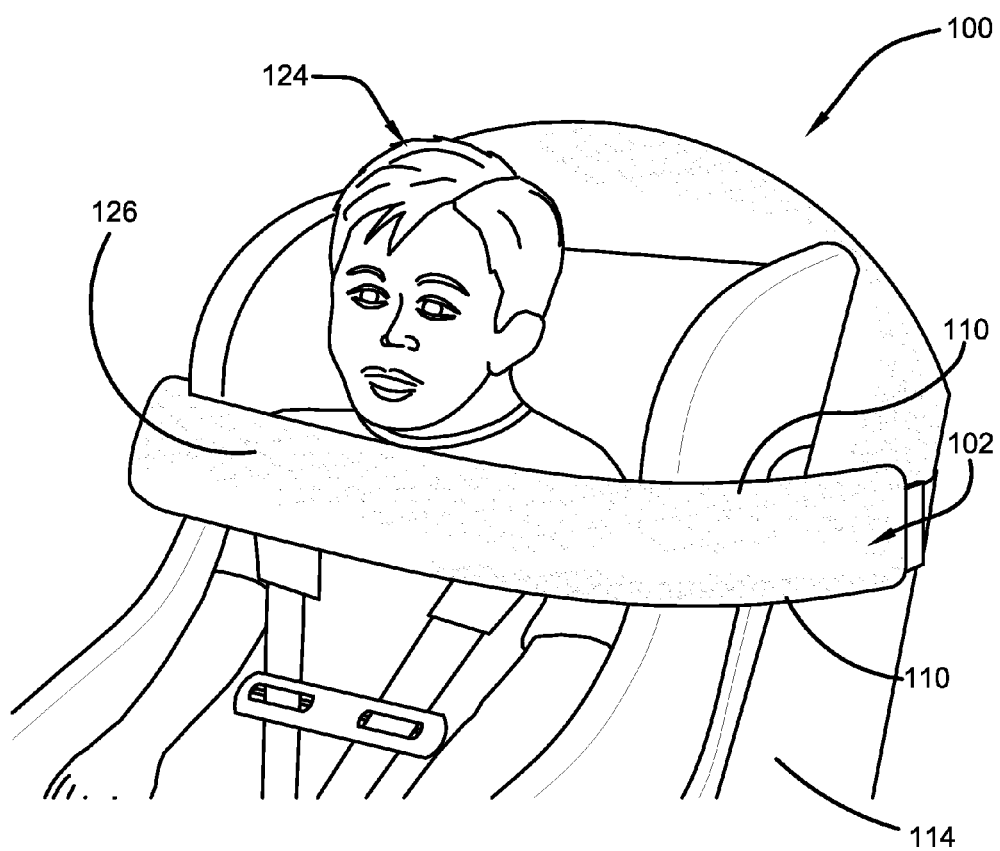
FIG. 2 illustrates a close-up, perspective view of the head and neck protector device in accordance with the disclosed architecture.
Figure 2A:
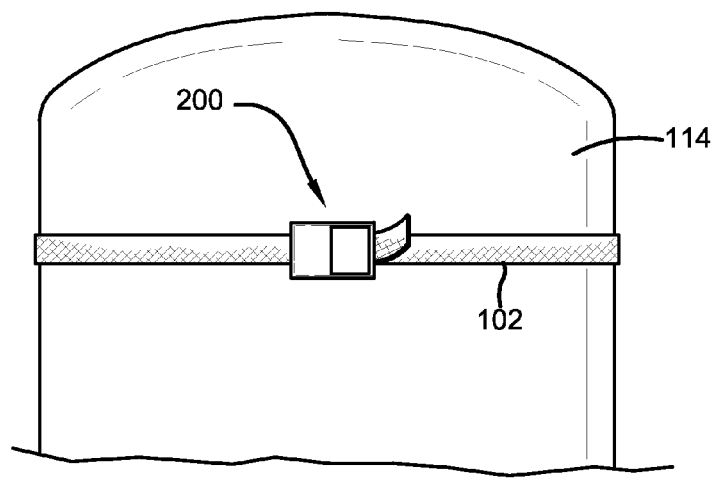
FIG. 2A illustrates a rear perspective view of the car seat with the head and neck protector device secured to it in accordance with the disclosed architecture.

The restraint strap 102 is approximately between 50 and 60 inches long as measured from the first end 106 to the second end 108, and approximately between 6 and 9 inches wide as measured from opposing sides 110, and approximately between 4 and 6 inches thick as measured from the front surface 112 to the back surface (not shown). Further, the restraint strap 102 can be different lengths depending on the size and shape of the car seat and how new or old the car seat is. For example in newer car seats, the restraint strap 102 can be sewed or glued onto both sides of the car seat, so the length of the restraint strap can be approximately between 50 and 60 inches long depending on whether the strap 102 is sewed or glued. However in older car seats, the restraint strap 102 wraps completely around the car seat and through brackets 120 to a point in the back of the car seat, where the strap 102 is secured via a locking clip 200 (as shown in FIG. 2A). Here, the restraint strap 102 can be approximately between 52-70 inches long.

Typically, the restraint strap 102 is an elongated strap that is generally rigid, and does not allow the restraint strap 102 to stretch (or elongate) when contacted. However, the restraint strap 102 does not have to be rigid, and can function by being partly elastomeric, such that the restraint strap 102 stretches (or elongates) when contacted, as long as the restraint strap 102 acts to restrain a child's neck and upper body in case of an automobile accident.

Figure 3:
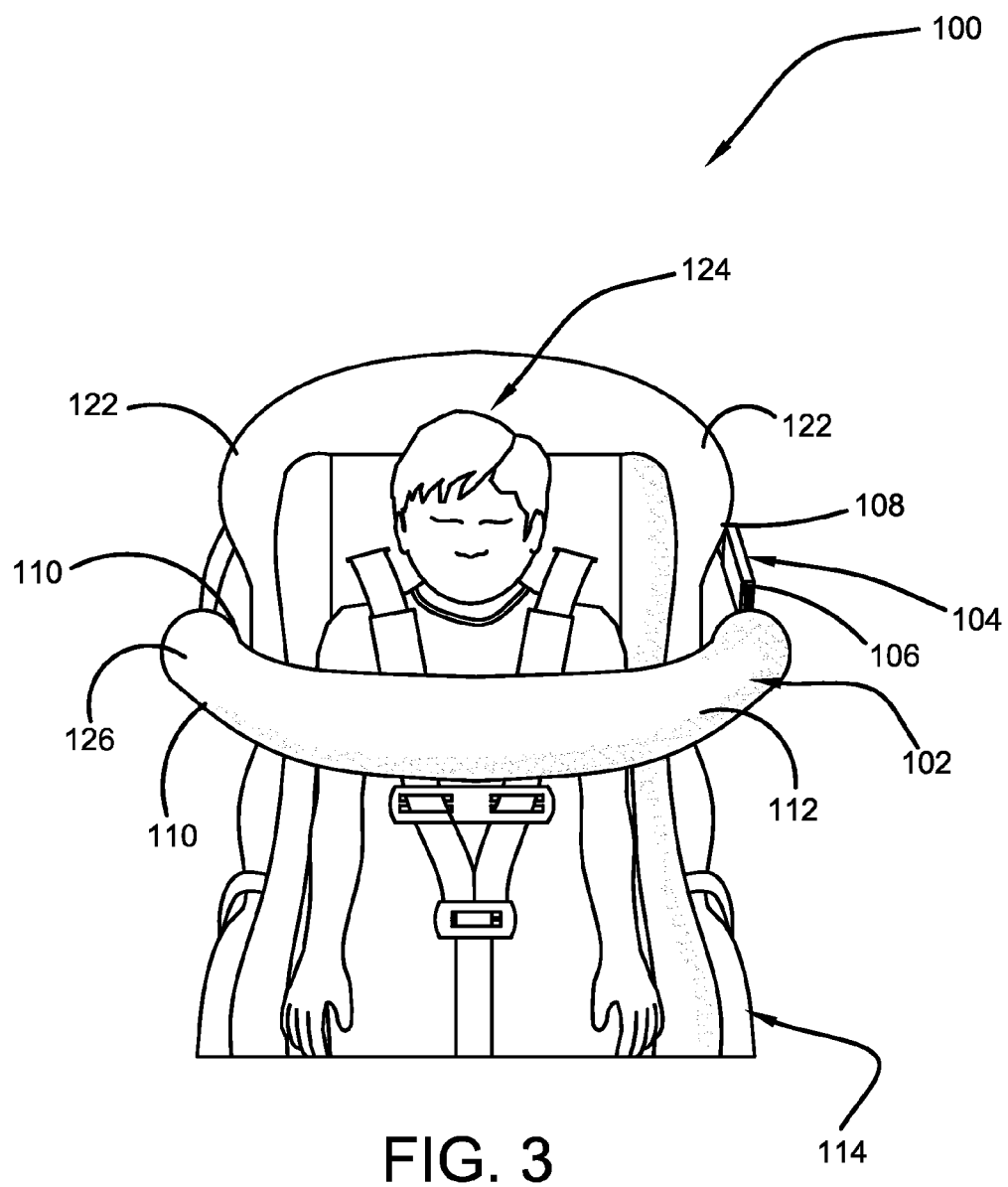
FIG. 3 illustrates a front, aerial view of the head and neck protector device in accordance with the disclosed architecture.
Figure 4:
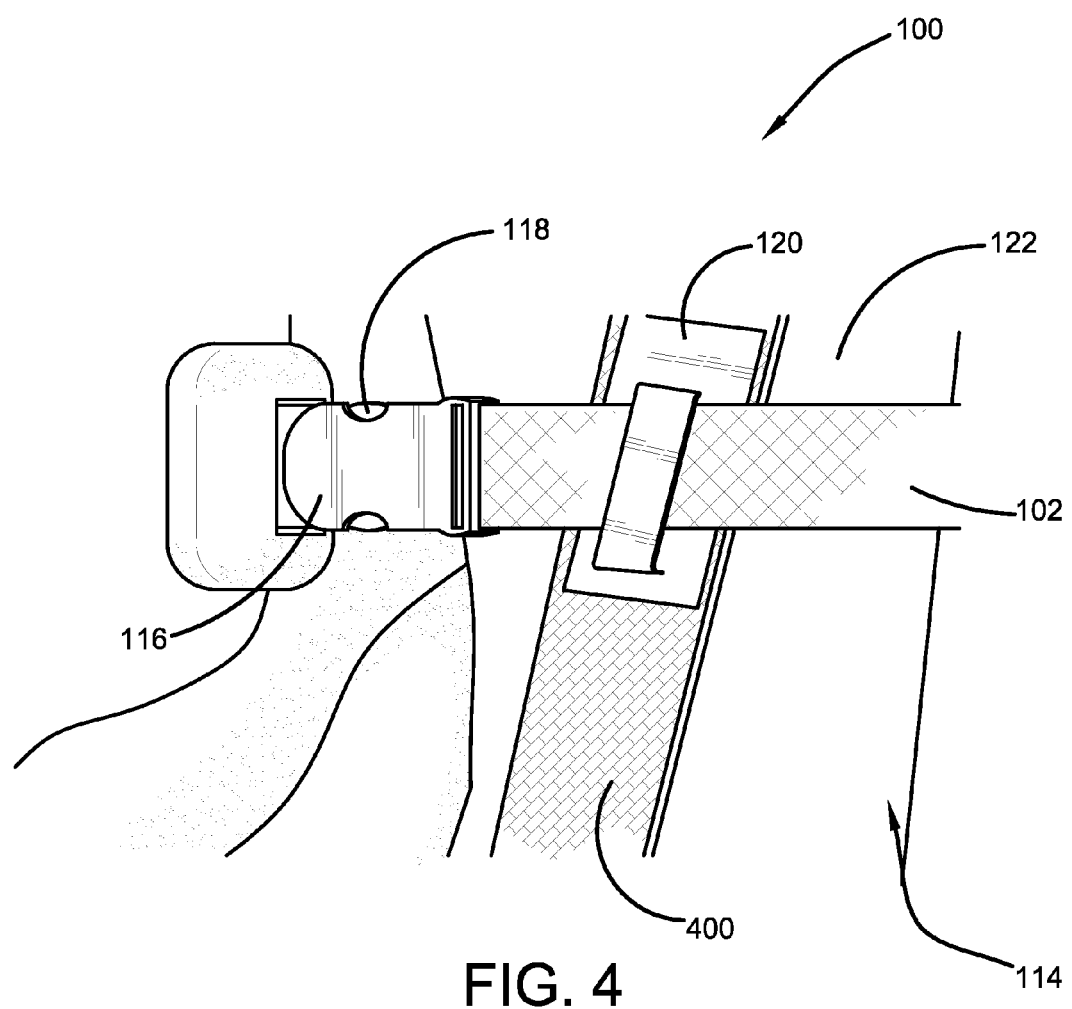
FIG. 4 illustrates a perspective view of the brackets and positioning components of the head and neck protector device in accordance with the disclosed architecture.

The head and neck protector device 100 further comprises a clasp 104 or other suitable securing mechanism as is known in the art, for securing the restraint strap 102 around a child's car seat 114. The clasp 104 typically comprises a male component 116 and a female component 118 (as shown in FIG. 4), which matingly attach together to secure the restraint strap 102. The male component 116 is preferably secured to first end 106 and the female component 118 is preferably secured to second end 108, or vice versa, via any suitable securing means as is known in the art, such as gluing, sewing, overmolding, etc. The restraint strap 102 is designed to wrap around a child's car seat 114 and be removably secured together, first end 106 to second end 108 as best illustrated in FIGS. 1-3.

Further, the restraint strap 102 is secured at the back of the car seat 114 via a securing component 200, such as a belt clip, latch, buckle, clasp, etc., or any other suitable securing mechanism as is known in the art (as shown in FIG. 2A). The securing component 200 acts to securely fasten the restraint strap 102 to the car seat 114 to maximize the protection the child receives with respect to the face, head, and neck during an accident. In a preferred embodiment, the restraint strap 102 can wrap clockwise from the first end 106, through the cushioning component 126 and through the brackets 120 to a point at the back of the car seat 114. Then, the other section of the restraint strap 102 is attached to the clasp 104 and goes through the bracket 120 counter clockwise (as you look at the car seat) to the back of the car seat 114. These restraint straps 102 meet at the back of the car seat 114 and are secured with a locking clip 200 or other securing means, to secure the restraint straps 102 to the car seat 114 and to each other.

The head and neck protector device 100 further comprises a pair of brackets 120 (as shown in FIG. 4) or other suitable attachment devices as is known in the art, which are secured to opposing sides 122 of the child's car seat 114. The brackets 120 would generally be constructed of nylon, polyvinyl chloride (PVC), acrylonitrile butadiene styrene (ABS), or any other similar plastics or fabrics, etc., though any other suitable material may be used to manufacture the brackets 120 as is known in the art without affecting the overall concept of the invention.

The brackets 120 typically comprise an opening for receiving the restraint strap 102 to hold the same in a desired position. Thus, the restraint strap 102 is threaded (or inserted) through the opening, which allows the brackets 120 to retain the restraint strap 102 in a desired position on the child's car seat 114. The brackets 120 can be permanently secured to the opposing sides 122 of the child's car seat 114 via any suitable securing means as is known in the art, such as screwing, gluing, utilizing a snap feature, etc. In contrast, a pair of positioning components 400 (shown in FIG. 4) can be used to removably secure the brackets 120 to the opposing sides 122 of the child's car seat 114. The pair of positioning components 400 can comprise a section of hook and loop fasteners, or any other suitable fasteners as is known in the art, which are exposed for attachment by the brackets 120.

The brackets 120 would then comprise a section of hook and loop fasteners, or any other suitable fasteners as is known in the art, which are secured to an underside of the brackets 120 for removably securing the brackets 120 to the pair of positioning components 400. The brackets 120 can then be removed from the hook and loop fastener section of the positioning component 400 and reapplied to another section of the positioning component 400. Thus, the brackets 120 can be repositioned vertically along the opposing sides 122 of the child's car seat 114, wherever the positioning components 400 are placed. A user can then position the brackets 120 as well as the restraint strap 102 at a desired height according to the size and/or height of the child 124 in the car seat 114.

The restraint strap 102 further comprises a cushioning component 126 that surrounds a portion of the restraint strap 102. The cushioning component 126 would generally be constructed of an open cell foam, a memory foam, or any other similar foam, etc., though any other suitable material may be used to manufacture the cushioning component 126 as is known in the art without affecting the overall concept of the invention. Typically, the cushioning component 126 is rectangular in shape, however any other suitable shape can be used as is known in the art without affecting the overall concept of the invention. The cushioning component 126 comprises a durable, yet soft material to cushion the child's head during an automobile accident or to the support a child's head falling onto his/her chest as he/she falls asleep when the vehicle is in motion.

FIG. 4 illustrates the brackets 120 and positioning components 400 of the head and neck protector device 100. As stated supra, the head and neck protector device 100 may comprise a pair of brackets 120 or other suitable attachment devices as is known in the art, which are secured to opposing sides 122 of the child's car seat 114. The brackets 120 typically comprise an opening for receiving the restraint strap 102. Thus, the restraint strap 102 is threaded (or inserted) through the opening, which allows the brackets 120 to retain the restraint strap 102 in a certain position on the child's car seat 114.

The brackets 120 can be permanently secured to the opposing sides 122 of the child's car seat 114 via any suitable securing means as is known in the art, such as screwing, gluing, utilizing a snap feature, etc. In contrast, a pair of positioning components 400 can be used to removably secure the brackets 120 to the opposing sides 122 of the child's car seat 114. The pair of positioning components 400 can comprise a section of hook and loop fasteners, or any other suitable fasteners as is known in the art, which are exposed for attachment by the brackets 120.

The brackets 120 would then comprise a section of hook and loop fasteners, or any other suitable fasteners as is known in the art, which are secured to an underside of the brackets 120 for removably securing the brackets 120 to the pair of positioning components 400. The brackets 120 can then be removed from the hook and loop fastener section of the positioning component 400 and reapplied to another section of the positioning component 400. Thus, the brackets 120 can be repositioned vertically along the opposing sides 122 of the child's car seat 114, wherever the positioning components 400 are placed. A user can then position the brackets 120 as well as the restraint strap 102 at a desired height according to the size and/or height of the child 124 in the car seat 114.

Figure 5:
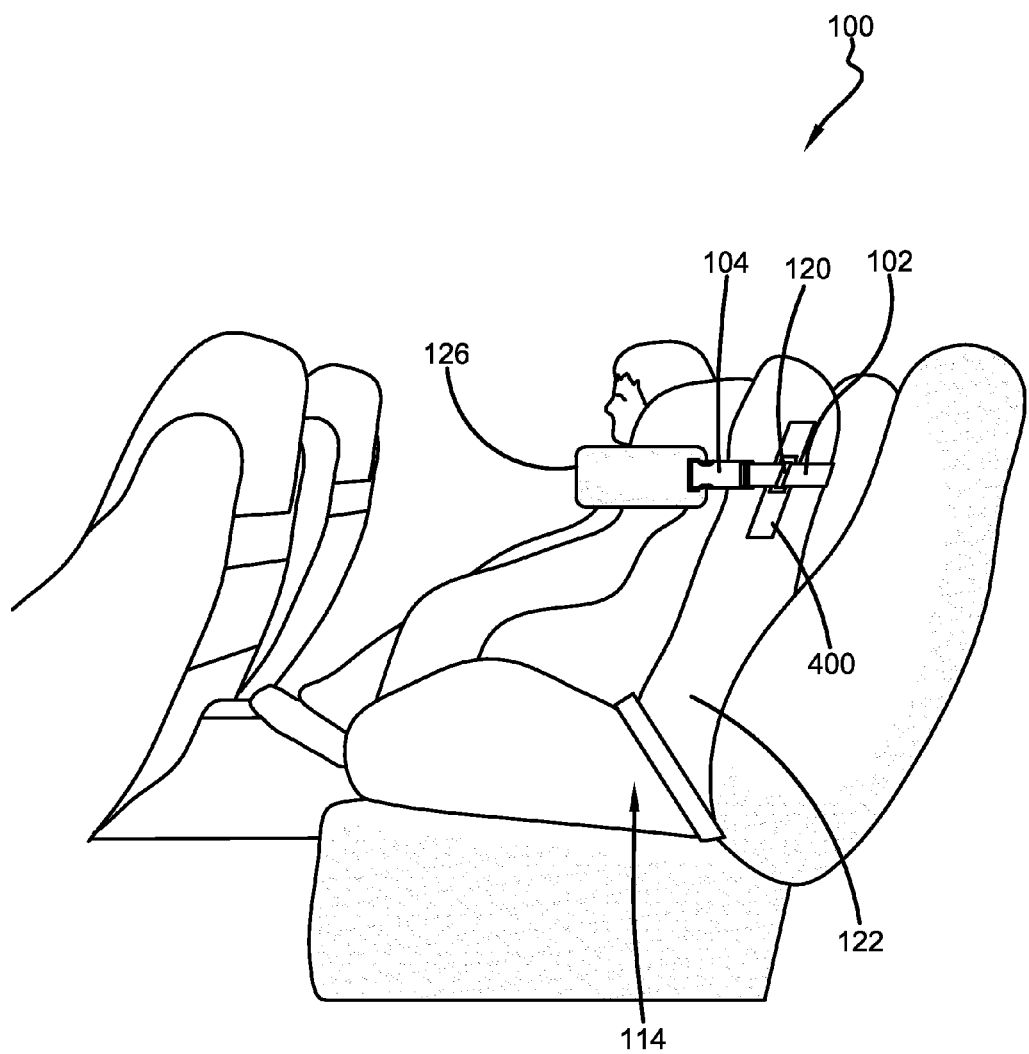
FIG. 5 illustrates a perspective view of the head and neck protector device in use in accordance with the disclosed architecture.

FIG. 5 illustrates the head and neck protector device 100 in use. In operation, a user (not shown) would choose the color and/or specific design of the head and neck protector device 100 that meets their needs and/or wants. The user would then determine the exact position to place the head and neck protector 100 on the car seat 114, depending on the size and/or height of the child 124. Typically, the user would position the brackets 120 on the opposing sides of 122 of the car seat 114 at the determined height, and would secure the brackets 120 via attaching the hook and loop fastener section of the brackets 120 to the hook and loop fastener section of the positioning components 400. Typically, the brackets 120 would be positioned at a height just below the child's eye level so as not to interfere with the child's vision.

Once the brackets 120 are secured at the determined height, the user would then insert the restraint strap 102 through the openings of the bracket 120 and wrap the restraint strap 102 completely around the child's car seat 114. The user would then secure together, the first end and the second end of the restraint strap 102 via mating the male and female components of the clasp 104 together. Once the restraint strap 102 is in place, the user positions the cushioning component 126 to be directly in front of the child's head, thus protecting the child's head from being thrown forward in an automobile accident, and also supporting a child's head falling onto his/her chest as he/she falls asleep when the vehicle is in motion.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A head and neck protector device for a child's car seat comprising:
    a restraint strap comprising a first end and a second end; and
    at least one clasp comprising a male and female component, wherein the male component is secured to the first end and the female component is secured to the second end of the restraint strap; and
    a pair of brackets secured to opposing sides of the child's car seat;
    wherein the pair of brackets comprise an opening for receiving the restraint strap; and
    wherein the restraint strap is removably secured to a child's car seat for restraining a child's head or neck.

2. The head and neck protector device of claim 1, further comprising a pair of positioning components secured to opposing sides of the child's car seat.

3. The head and neck protector device of claim 1, further comprising a cushioning component that surrounds a portion of the restraint strap.

4. The head and neck protector device of claim 3, wherein the cushioning component comprises an open cell foam.

5. The head and neck protector device of claim 4, wherein the cushioning component is rectangular in shape.

6. A head and neck protector device for a child's car seat, comprising:
    a restraint strap comprising a first end and a second end;
    a cushioning component that surrounds a portion of the restraint strap;
    at least one clasp comprising a male and female component, wherein the male component is secured to the second end and the female component is secured to the first end of the restraint strap; and
    a pair of positioning components secured to opposing sides of the child's car seat; and
    a pair of brackets secured to opposing sides of the child's car seat;
    wherein the pair of brackets comprise an opening for receiving the restraint strap; and
    wherein the restraint strap is removably secured to a child's car seat for restraining a child's head or neck.

7. The head and neck protector device of claim 6, wherein the cushioning component comprises an open cell foam.

8. The head and neck protector device of claim 7, wherein the cushioning component is rectangular in shape.

9. A head and neck protector device for a child's car seat, comprising:
    a restraint strap comprising a first end and a second end;
    a cushioning component that surrounds a portion of the restraint strap;
    at least one clasp comprising a male and female component, wherein the male component is secured to the first end and the female component is secured to the second end of the restraint strap; and
    a pair of brackets secured to opposing sides of the child's car seat,
    wherein the pair of brackets comprise an opening for receiving the restraint strap.

10. The head and neck protector device of claim 9, further comprising a pair of positioning components secured to opposing sides of the child's car seat.

* * * * *